(12) United States Patent
Niepelt

(10) Patent No.: US 6,783,842 B2
(45) Date of Patent: Aug. 31, 2004

(54) MULTI-LAYER CO-EXTRUDED FILM

(75) Inventor: Ralf Niepelt, Gronau (DE)

(73) Assignee: Nordenia Deutschland Gronau GmbH, Gronau (DE)

( * ) Notice: Subject to any disclaimer, the term of this patent is extended or adjusted under 35 U.S.C. 154(b) by 22 days.

(21) Appl. No.: 10/279,946

(22) Filed: Oct. 24, 2002

(65) Prior Publication Data

US 2003/0091850 A1 May 15, 2003

(30) Foreign Application Priority Data

Oct. 25, 2001 (DE) .......................................... 101 52 865

(51) Int. Cl.$^7$ .......................... B32B 7/02; B32B 27/32
(52) U.S. Cl. ...................... 428/213; 428/343; 428/516; 428/517; 428/521
(58) Field of Search ................................. 428/213, 343, 428/516, 517, 521

(56) References Cited

U.S. PATENT DOCUMENTS 6,060,136 A   5/2000   Patrick et al. ............. 428/35.2

FOREIGN PATENT DOCUMENTS

EP   1 138 604   3/2000

*Primary Examiner*—D. S. Nakarani
(74) *Attorney, Agent, or Firm*—Collard & Roe, P.C.

(57) ABSTRACT

A multi-layer co-extruded film is particularly intended for use as a labeling, a laminating or a packaging film. The film includes two outer layers (1) consisting of a polyolefin, a polyolefin mixture or an olefin copolymer, and a core consisting of a mixture of styrene homopolymers and styrene-butadiene-styrene block copolymers at least in the areas bordering on the outer layers. The mixture contains more than 50% by weight up to a maximum of 90% by weight styrene homopolymer, the balance being styrene-butadiene-styrene block copolymer.

8 Claims, 1 Drawing Sheet

MULTI-LAYER CO-EXTRUDED FILM

CROSS REFERENCE TO RELATED APPLICATIONS

Applicant claims priority under 35 U.S.C. §119 of German Application No. 101 52 865.5 filed Oct. 25, 2001.

BACKGROUND OF THE INVENTION

1. Field of the Invention

The present invention relates to a multi-layer film produced by co-extrusion, which is particularly intended for use as a labeling film, a laminating film or a packaging film.

2. The Prior Art

A multi-layer packaging film is known from U.S. Pat. No. 6,060,136. This film includes two polyolefinic outer layers and a core consisting of a mixture of styrene-homopolymers and styrene-butadiene-styrene block polymers (SBS-block copolymer). The core may have a multi-layer structure in which at least one layer consists of a mixture of styrene homopolymers and SBS block copolymers. The content of styrene homopolymers in the mixture amounts to 50% by weight at the most, and the preferred range is in the range of 10% and 20% by weight.

SUMMARY OF THE INVENTION

It is an object of the invention to provide a film with enhanced rigidity that is suitable as a labeling film or a laminating film and can be easily processed. When used for packaging, the film should exhibit improved dead-fold and twisting properties.

The above objects are accomplished with a multi-layer film produced by co-extrusion that includes two outer layers made of a polyolefin, a polyolefin mixture or an olefin copolymer, and a core that consists of a mixture of styrene homopolymers and styrene-butadiene-styrene block copolymers at least in the areas bordering on the outer layers. The mixture contains more than 50% by weight up to a maximum of 90% by weight styrene homopolymers, the balance of the mixture being styrene-butadiene-styrene block copolymers. The film preferably has a thickness of between 20 and 100 $\mu$m and can be used as a labeling, laminating or packaging film. Because the film in accordance with the invention has a high styrene content near the polyolefinic outer layers, the film exhibits good stiffness properties. The addition of styrene-butadiene-styrene block copolymers (SBS block copolymers) is required in order to produce the adhesion to the polyolefinic outer layers. Surprisingly low amounts of SBS block copolymers are adequate for this purpose. To that extent, the content of SBS block copolymers in the areas bordering on the outer layers amounts only to between 10% by weight and less than 50% by weight.

The core may be made up of only one single layer with a homogeneous composition of the mixture. The thickness ratio of the layers can be adapted to the purpose of application. The ratio of thickness between one of the outer layers and the core can be selected between 1:1 and 1:6. For many applications, the thickness of the core amounts to about three times the thickness of an outer layer.

According to a preferred embodiment of the invention, the core has three layers, so that a five-layer structure is obtained overall. Various possibilities are available for forming the layers. According to one embodiment, the inner layer of the core is made up of a polyolefin, a polyolefin mixture or an olefin copolymer, and the layers bordering on the core on the two sides of the inner layer are made up of a mixture of styrene-homopolymers and styrene-butadiene-styrene block copolymers with more than 50% by weight styrene homopolymer and at least 10% by weight styrene-butadiene-styrene block copolymer. This embodiment is especially advantageous for films with a high film thickness. With a low amount of styrene homopolymer material used based on the weight of the film, a multi-layer film is formed that has good rigidity, high transparency and a good tear propagation property in the transverse direction. In addition, the film remains flexible and deformable for further processing. With a film having this layer structure, surprisingly good rigidity is obtained due to the high concentrations of the styrene homopolymers near the outer layers.

In another embodiment that is primarily intended for thinner foils, the core is made up of three layers each made up of a mixture of styrene homopolymers and styrene-butadiene-styrene block copolymers. The inner layer has a higher concentration of styrene homopolymers than the layers bordering on it on both sides. Due to the step-wise increase in concentration of styrene homopolymers from the outside inwards, a film may be obtained with both high rigidity and good adhesion of the polyolefinic outer layers. The inner layer of the core may be formed also by pure styrene homopolymers. With this layer structure, thin films with high rigidity can be produced.

For embodiments having a 5-layer structure, the layers in the film may be have a thickness ratio between 1:1:1:1:1 and 6:1:6:1:6.

The outer layers preferably are made up of polyethylene or an ethylene copolymer. For example, the outer layers may be formed from linear low density polyethylene (LLDPE) which is particularly easy to process and is also well-suited as a sealing layer.

At least one of the layers may additionally contain pigments and/or fillers. Furthermore, an additional layer may be applied to one of the outer layers. Suitable for this purpose are, for example, adhesive layers or layers suitable for imprinting. Moreover, the outer layers may be after-treated physically (e.g. by a corona treatment), or also chemically, in the manner known per se, so that their adhesive and/or their imprinting properties are enhanced.

The multi-layered film as defined by the invention has a broad spectrum of application. It is suitable as a labeling film and a packaging film, and in this area it is especially useful as a twisting film for candies. The film may also be used to form a packaging pouch, and also may be used as a laminating film. As opposed to blended films using mixtures of polyolefins and polystyrene, the film in accordance with the invention possesses high transparency, which is an advantage for many applications.

BRIEF DESCRIPTION OF THE DRAWINGS

The invention is explained in the following with the help of the drawings showing exemplified embodiments, in which.

DETAILED DESCRIPTION OF PREFERRED EMBODIMENTS

Figure 1:
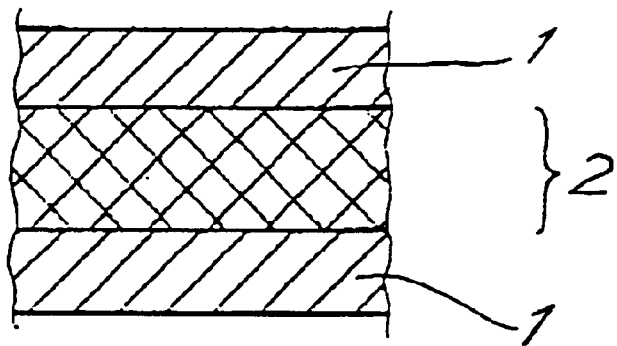
FIG. 1 shows a cross-section through a three-layer film according to the invention.
Figure 2:
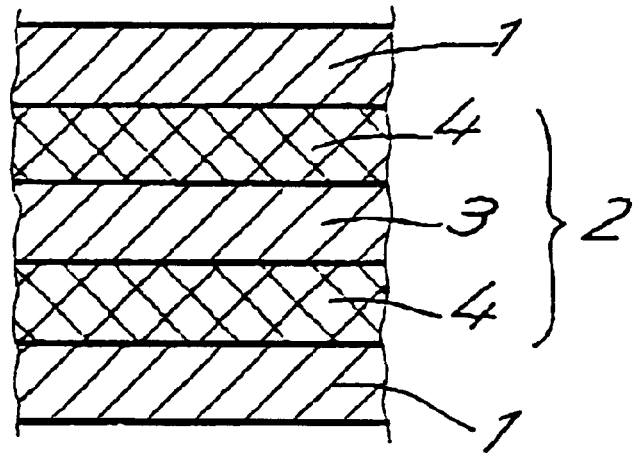
FIG. 2 shows a cross-section through a five-layer film according to the invention.
Figure 3:
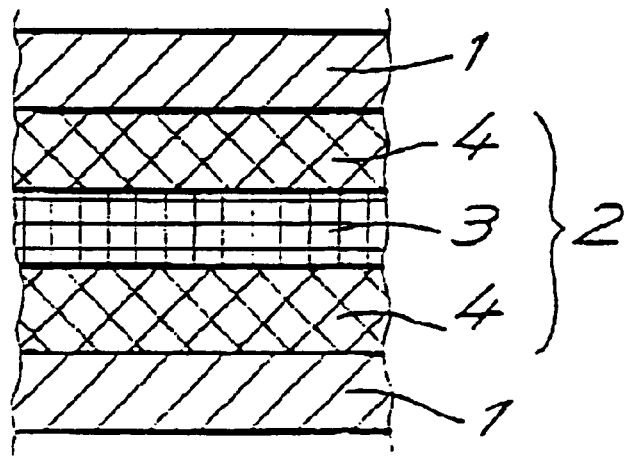
FIG. 3 shows another embodiment of a five-layer film according to the invention.

FIGS. 1–3 show multi-layer films that are produced by co-extrusion and can be used as labeling, laminating or packaging films. Each film includes two outer layers 1 consisting of a polyolefin, a polyolefin mixture or an olefin copolymer, and a core 2 consisting of a mixture of styrene homopolymers and styrene-butadiene-styrene block copolymers at least in the areas bordering on the outer layers. In this connection, the mixture contains more than 50% by weight up to maximally 90% by weight styrene homopolymers, the balance being styrene-butadiene-styrene block copolymers (SBS block copolymers). The high content of styrene homopolymers especially in the areas bordering on the outer layers provides the foil with high rigidity. The styrene-butadiene-styrene block copolymers, which are used in the mixture in an amount coming to at least 10% by weight, are required for the adhesion of polyolefinic outer layers 1 to core 2.

In the embodiment shown in FIG. 1, core 2 consists of one single layer having a homogeneous mixture composition. This layer consists of styrene homopolymers and SBS block copolymers, in which the styrene homopolymer component is in the range of from more than 50% by weight up to a maximum of 90% by weight. The thickness ratio between one of the outer layers 1 and core 2 may range between 1:1 and 1:6.

The film shown in FIG. 2 includes two outer layers 1 made of a polyolefin, a polyolefin mixture and/or olefin copolymers, as well as a three-layered core 2. Core 2 has an inner layer 3 which consists of a polyolefin, a polyolefin mixture or an olefin copolymer. Core 2 also has layers 4 on the borders of the core, which consist of a mixture of styrene homopolymers and SBS block copolymers, the mixture having more than 50% by weight styrene homopolymers and at least 10% by weight SBS block copolymers.

The embodiment shown in FIG. 3 is also a multi-layer film, including two outer layers 1 and a three-layered core 2. Outer layers 1 consist of a polyolefin, a polyolefin mixture, and/or an olefin copolymer. Layers 4 of core 2, which border on outer layers 1, consist of a mixture of styrene homopolymers and SBS block copolymers, in which the styrene homopolymer component ranges from more than 50% by weight up to 90% by weight at the most. Inner layer 3 of core 2 consists of polystyrene homopolymer or a mixture of styrene homopolymers and SBS block copolymers. The concentration of styrene homopolymers is higher in inner layer 3 than in the adjacent layers on both sides.

The films shown in FIGS. 1 to 3 may have on one of the outer layers an additional adhesive layer or an additional coating for improving the imprintability.

EXAMPLE 1

A three-layer film is co-extruded in a blown-foil extruder (nozzle diameter=315 mm). The inner layer consists of a mixture of SBS block copolymers with polystyrene. The outer layers consist of a polyethylene copolymer with butene, in which the density of the polyethylene corresponds with 0.918 to 0.940 g/cm; and the melt index ranges between 0.7 to 4 g/10 minutes at 190° C. and 2.16 kg. The composition of the mixture of the inner layer may be selected between more than 50% by weight up to 80% by weight polystyrene, the balance being SBS block copolymer, depending on the requirements with respect to rigidity and elasticity. It is not necessary to add an antistatic agent to the inner layer. The total thickness of the film amounts to 50 μm, in which each of the two outer layers has a thickness of 10 μm and the inner layer has a thickness of 30 μm.

EXAMPLE 2

A three-layer film is co-extruded on a co-extrusion blow-foil slot die extruder. A polypropylene random copolymer with ethylene is used for the outer layers. The density of the polypropylene amounts to 0.902 g/cm; and the melt index comes to 6 g/10 minutes at 230° C. and 2.16 kg. The inner layer has the composition specified in Example 1. The total thickness of the film amounts to 50 μm, in which the inner layer has a thickness of 36 μm.

EXAMPLE 3

A five-layer film is co-extruded on a blow-foil extruder (nozzle diameter=315 mm), in which the outer layers consist of pure polyethylene (LLDPE) with a density of from 0.918 to 0.940 g/cm; and the melt index specified in Example 1. The three-layer core includes an inner layer consisting of recycled polypropylene, as well as layers consisting of a mixture of SBS block copolymers with polystyrene bordering on the two sides of the inner layer. The total thickness of the multi-layer film amounts to 50 μm, in which all layers have a thickness of 10 μm.

EXAMPLE 4

This example relates to a five-layer film with outer layers consisting of pure polyethylene. The thickness of each layer amounts to 5 μm. The three-layer core includes an inner layer consisting of a polystyrene homopolymer and layers consisting of a mixture of polystyrene and SBS block copolymers bordering on the inner layer on both sides. Each layer of the core has a thickness of 7 μm.

Accordingly, while a few embodiments of the present invention have been shown and described, it is to be understood that many changes and modifications may be made thereunto without departing from the spirit and scope of the invention as defined in the appended claims.

What is claimed is:

1. A multi-layer film comprising
   (a) first and second outer layers, each of said outer layers comprising a polyolefin, a polyolefin mixture, or an olefin copolymer; and
   (b) a core disposed between said first and second outer layers, said core comprising a mixture of styrene homopolymers and styrene-butadiene-styrene block copolymers at least in areas bordering on said outer layers, said mixture of styrene homopolymers and styrene-butadiene-styrene block copolymers containing more than 50% by weight up to a maximum of 90% by weight styrene homopolymers, the balance being styrene-butadiene-styrene block copolymers;
   wherein said core comprises first and second border layers and an inner layer disposed between said border layers, said inner layer comprising a polyolefin, a polyolefin mixture or an olefin copolymer, and each of said first and second border layers comprising a mixture of styrene homopolymers and styrene-butadiene-styrene block copolymers, said mixture having more than 50% by weight styrene homopolymers and at least 10% by weight styrene-butadiene-styrene block copolymers.

2. The multi-layer film according to claim 1, wherein the thickness ratio between one of said first and second outer layers and said core is between 1:1 and 1:6.

3. The multi-layer film according to claim 1, wherein each of said first and second outer layers comprises polyethylene or an ethylene copolymer.

4. The multi-layer film according to claim 1, wherein at least one of the first outer layer, the second outer layer, and the core contains pigments or fillers.

5. The multi-layer film according to claim 1, further comprising an adhesive layer or an additional layer with an imprintable surface arranged on one of said first and second outer layers.

6. A multi-layer film comprising
 (a) first and second outer layers, each of said outer layers comprising a polyolefin, a polyolefin mixture, or an olefin copolymer; and
 (b) a core disposed between said first and second outer layers, said core comprising a mixture of styrene homopolymers and styrene-butadiene-styrene block copolymers at least in areas bordering on said outer layers, said mixture of styrene homopolymers and styrene-butadiene-styrene block copolymers containing more than 50% by weight up to a maximum of 90% by weight styrene homopolymers, the balance being styrene-butadiene-styrene block copolymers;
 wherein said core comprises first and second border layers and an inner layer disposed between said border layers, each of said border layers and said inner layer comprising a mixture of styrene homopolymers and styrene-butadiene-styrene block copolymers, said inner layer having a higher concentration of styrene homopolymers than said first and second border layers.

7. A multi-layer film comprising
 (a) first and second outer layers, each of said outer layers comprising a polyolefin, a polyolefin mixture, or an olefin copolymer; and
 (b) a core disposed between said first and second outer layers, said core comprising a mixture of styrene homopolymers and styrene-butadiene-styrene block copolymers at least in areas bordering on said outer layers, said mixture of styrene homopolymers and styrene-butadiene-styrene block copolymers containing more than 50% by weight up to a maximum of 90% by weight styrene homopolymers, the balance being styrene-butadiene-styrene block copolymers;
 wherein said core comprises first and second border layers and an inner layer disposed between said border layers, said inner layer comprising styrene homopolymers and each of said first and second border layers comprising a mixture of styrene homopolymers and styrene-butadiene-styrene block copolymers.

8. A multi-layer film comprising
 (a) first and second outer layers, each of said outer layers comprising a polyolefin, a polyolefin mixture, or an olefin copolymer; and
 (b) a core disposed between said first and second outer layers, said core comprising a mixture of styrene homopolymers and styrene-butadiene-styrene block copolymers at least in areas bordering on said outer layers, said mixture of styrene homopolymers and styrene-butadiene-styrene block copolymers containing more than 50% by weight up to a maximum of 90% by weight styrene homopolymers, the balance being styrene-butadiene-styrene block copolymers;
 wherein said core comprises first and second border layers and an inner layer disposed between said border layers, and the thickness ratio of the first outer layer, the first border layer, the inner layer, the second border layer, and the second outer layer is in the range from 1:1:1:1:1 to 6:1:6:1:6.

* * * * *